United States Patent
Bostick et al.

(10) Patent No.: US 9,609,479 B1
(45) Date of Patent: Mar. 28, 2017

(54) GEO-FENCED EVENT ALERTS

(71) Applicant: International Business Machines Corporation, Armonk, NY (US)

(72) Inventors: James E. Bostick, Cedar Park, TX (US); John M. Ganci, Jr., Cary, NC (US); Sarbajit K. Rakshit, Kolkata (IN); Kimberly G. Starks, Nashville, TN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/920,939

(22) Filed: Oct. 23, 2015

(51) Int. Cl.
*H04W 24/00* (2009.01)
*H04W 4/02* (2009.01)
*H04W 4/12* (2009.01)
*G06F 17/30* (2006.01)

(52) U.S. Cl.
CPC ........ *H04W 4/021* (2013.01); *G06F 17/3087* (2013.01); *H04W 4/12* (2013.01)

(58) Field of Classification Search
CPC .... H04W 4/02; H04W 64/00; H04M 1/52719
USPC .............. 455/456.3, 456.1, 550.1; 705/14.58
See application file for complete search history.

(56) References Cited

U.S. PATENT DOCUMENTS

| | | |
|---|---|---|
| 2011/0148634 A1 | 6/2011 | Putz |
| 2013/0073388 A1 | 3/2013 | Heath |
| 2013/0295970 A1 | 11/2013 | Sheshadri et al. |
| 2014/0066090 A1* | 3/2014 | Henderson ............ H04W 4/021 455/456.1 |
| 2015/0031388 A1* | 1/2015 | Chatterjee ............. H04W 4/021 455/456.1 |
| 2015/0065177 A1 | 3/2015 | Phillips et al. |
| 2015/0181382 A1* | 6/2015 | McDonald .............. H04L 67/18 455/456.3 |
| 2015/0278864 A1* | 10/2015 | McDevitt ........... G06Q 30/0267 705/14.58 |
| 2015/0341747 A1* | 11/2015 | Barrand ............. G06Q 30/0201 455/405 |
| 2016/0005077 A1* | 1/2016 | McDevitt ........... G06Q 30/0208 705/14.58 |

FOREIGN PATENT DOCUMENTS

| | | |
|---|---|---|
| EP | 2744234 A1 | 6/2014 |
| WO | 2014118534 A1 | 8/2014 |

OTHER PUBLICATIONS

Clements, Brandon; "Blab 'acts as crystal ball' for social media"; Blab Predicts; CNN Smart Business; Sep. 3, 2014; Printed on May 18, 2015; © Copyright 2014 Blab; <http://www.blabpredicts.com/blog/blab-news/post/blab-acts-as-crystal-ball-for-social-media>.

(Continued)

*Primary Examiner* — Danh Le
(74) *Attorney, Agent, or Firm* — Isaac J. Gooshaw

(57) ABSTRACT

A method, computer program product, and computer system is provided. A processor identifies an event based, at least in part, on a first news article. A processor determines a first area of impact for the event based, at least in part, on the first news article. Responsive to a determination that a current location of a first user is within the first area of impact, a processor sends a first message to the first user based, at least in part, on the first news article.

17 Claims, 5 Drawing Sheets

(56) References Cited

OTHER PUBLICATIONS

Francica, Joe; "Geofencing: Now a Market Unto Itself"; Directions Mag; Location Intelligence; Published Wednesday, Feb. 20, 2013; Printed May 18, 2015; © 2015 Directions Media; <http://www.directionsmag.com/entry/geofencing-now-a-market-unto-itself/310269>.

Szczytowski, Piotr; "Geo-fencing based Disaster Management Service"; 2014 ASE Bigdata/Socialcom/Cybersecurity Conference, Stanford University, May 27-31, 2014; © ASE 2014; pp. 1-12.

"A Method of customising a User Environment based on Location"; An IP.com Prior Art Database Technical Disclosure; IP.com No. 000199590; Electronic Publication: Sep. 10, 2010; pp. 1-2.

"Mobile Device Resource Conservation During Geo-Location Operations"; An IP.com Prior Art Database Technical Disclosure; IP.com No. 000231493; Electronic Publication: Oct. 2, 2013; pp. 1-18.

"System and Method for Map Population and Geofencing based on Images"; An IP.com Prior Art Database Technical Disclosure; IP.com No. 000235996; Electronic Publication: Apr. 1, 2014; 2 pages.

\* cited by examiner

GEO-FENCED EVENT ALERTS

BACKGROUND OF THE INVENTION

The present invention relates generally to the field of emergency warning systems, and more particularly to generating a geo-fences for an event.

An emergency warning system provides warnings of emergencies on a local, regional, or national basis. Warnings provide notice to members of the public of an impending emergency. These warnings may be necessary for a number of reasons, including weather emergencies (e.g., tornadoes, hurricanes, and ice storms), geological disasters (e.g., earthquakes, landslides, volcanic eruptions, and tsunamis), or any event that may impact public safety. Emergency warning systems provide notice of events to the public so that they respond to or prepare for the emergency. However, emergency warning systems do not provide any manner of a targeted distribution. All members of an emergency warning system will receive warnings regardless of the impact the event causing the warning may have.

A geo-fence is a virtual perimeter corresponding to a real-world geographic area. The process of creating a geo-fence is called geo-fencing. Geo-fences are used in location based services when determining if a user has entered an area. A mobile device is carried by the user with a location tracking system, such as a global positioning system (GPS). Typically, when the user enters a geo-fenced area an action is performed by the mobile device carried by the user. The mobile device may send information indicating the user's entering of the area to another device or the mobile device may alert the user based on the entering of the geo-fenced area.

SUMMARY

Viewed from a first aspect, the present invention provides a method to generate alerts based on geo-fenced areas. A processor identifies an event based, at least in part, on a first news article. A processor determines a first area of impact for the event based, at least in part, on the first news article. Responsive to a determination that a current location of a first user is within the first area of impact, a processor sends a first message to the first user based, at least in part, on the first news article. Advantageously, this invention provides alerts to users affected by an event while excluding those who are not. In yet a further optional aspect, a processor identifies an update to the event based, at least in part, on a second news article. A processor determines a second area of impact for the event based, at least in part, on the second news article. Advantageously, some embodiments of this invention provide information regarding multiple events and determining an area each event will impact. As such, a user is kept up to date on the ongoing events in an area. In yet a further optional aspect, in response to a determination that a current location of a second user is within the second area of impact, a processor sends a second message to the second user based, at least in part, on the second news article. Advantageously, some embodiments of this invention provide alerts to users of a variety of events. As such, relevant news can be provided to the user to inform the user of the events. In yet a further optional aspect of the invention, a processor sends alerts wherein the current location of the second user is outside the first area of impact. Advantageously, some embodiments of this invention provide alerts to users that are currently outside an area of impact. As such, the user can receive alerts for areas that they may potentially be at in the future. In yet a further optional aspect of the invention, in response to a determination that a home location of a second user is within the first area of impact, a processor sends a second message to the second user based, at least in part, on the first news article, wherein the current location of the second user is outside the first area of impact. Advantageously, some embodiments of this invention provide alerts to users who are away from home, but an event is currently affecting the area associated with the user's home location. As such, the user is kept up to date regarding events that may impact the user's home location. In yet a further optional aspect, a processor determines the home location based on a social network profile of the user. Advantageously, some embodiments of this invention provide a mechanism to determine a user's home location by analyzing a social network profile of the user for information. As such, a home location can be determined without requiring direct input by a user. Embodiments of the present invention may not possess all the potential advantages discussed herein and the potential advantages are not necessarily required of all embodiments.

Viewed from a further aspect, the present invention provides a computer program product to generate alerts based on geo-fenced areas. A processor identifies an event based, at least in part, on a first news article. A processor determines a first area of impact for the event based, at least in part, on the first news article. Responsive to a determination that a current location of a first user is within the first area of impact, a processor sends a first message to the first user based, at least in part, on the first news article. Advantageously, this invention provides alerts to users affected by an event while excluding those who are not. In yet a further optional aspect, a processor identifies an update to the event based, at least in part, on a second news article. A processor determines a second area of impact for the event based, at least in part, on the second news article. Advantageously, some embodiments of this invention provide information regarding multiple events and determining an area each event will impact. As such, a user is kept up to date on the ongoing events in an area. In yet a further optional aspect, in response to a determination that a current location of a second user is within the second area of impact, a processor sends a second message to the second user based, at least in part, on the second news article. Advantageously, some embodiments of this invention provide alerts to users of a variety of events. As such, relevant news can be provided to the user to inform the user of the events. In yet a further optional aspect of the invention, a processor sends alerts wherein the current location of the second user is outside the first area of impact. Advantageously, some embodiments of this invention provide alerts to users that are currently outside an area of impact. As such, the user can receive alerts for areas that they may potentially be at in the future. In yet a further optional aspect of the invention, in response to a determination that a home location of a second user is within the first area of impact, a processor sends a second message to the second user based, at least in part, on the first news article, wherein the current location of the second user is outside the first area of impact. Advantageously, some embodiments of this invention provide alerts to users who are away from home, but an event is currently affecting the area associated with the user's home location. As such, the user is kept up to date regarding events that may impact the user's home location. In yet a further optional aspect, a processor determines the home location based on a social network profile of the user. Advantageously, some embodiments of this invention provide a mechanism to determine a user's home location by analyzing a social network profile of the user for information. As such, a home location can be determined without requiring direct input by a user. Embodiments of the present invention may not possess all the potential advantages discussed herein and the potential advantages are not necessarily required of all embodiments.

Viewed from a further aspect, the present invention provides a computer system to generate alerts based on geofenced areas. A processor identifies an event based, at least in part, on a first news article. A processor determines a first area of impact for the event based, at least in part, on the first news article. Responsive to a determination that a current location of a first user is within the first area of impact, a processor sends a first message to the first user based, at least in part, on the first news article. Advantageously, this invention provides alerts to users affected by an event while excluding those who are not. In yet a further optional aspect, a processor identifies an update to the event based, at least in part, on a second news article. A processor determines a second area of impact for the event based, at least in part, on the second news article. Advantageously, some embodiments of this invention provide information regarding multiple events and determining an area each event will impact. As such, a user is kept up to date on the ongoing events in an area. In yet a further optional aspect, in response to a determination that a current location of a second user is within the second area of impact, a processor sends a second message to the second user based, at least in part, on the second news article. Advantageously, some embodiments of this invention provide alerts to users of a variety of events. As such, relevant news can be provided to the user to inform the user of the events. In yet a further optional aspect of the invention, a processor sends alerts wherein the current location of the second user is outside the first area of impact. Advantageously, some embodiments of this invention provide alerts to users that are currently outside an area of impact. As such, the user can receive alerts for areas that they may potentially be at in the future. In yet a further optional aspect of the invention, in response to a determination that a home location of a second user is within the first area of impact, a processor sends a second message to the second user based, at least in part, on the first news article, wherein the current location of the second user is outside the first area of impact. Advantageously, some embodiments of this invention provide alerts to users who are away from home, but an event is currently affecting the area associated with the user's home location. As such, the user is kept up to date regarding events that may impact the user's home location. In yet a further optional aspect, a processor determines the home location based on a social network profile of the user. Advantageously, some embodiments of this invention provide a mechanism to determine a user's home location by analyzing a social network profile of the user for information. As such, a home location can be determined without requiring direct input by a user. Some embodiments of the present invention may not possess all the potential advantages discussed herein and the potential advantages are not necessarily required of all embodiments.

DETAILED DESCRIPTION

Figure 1:
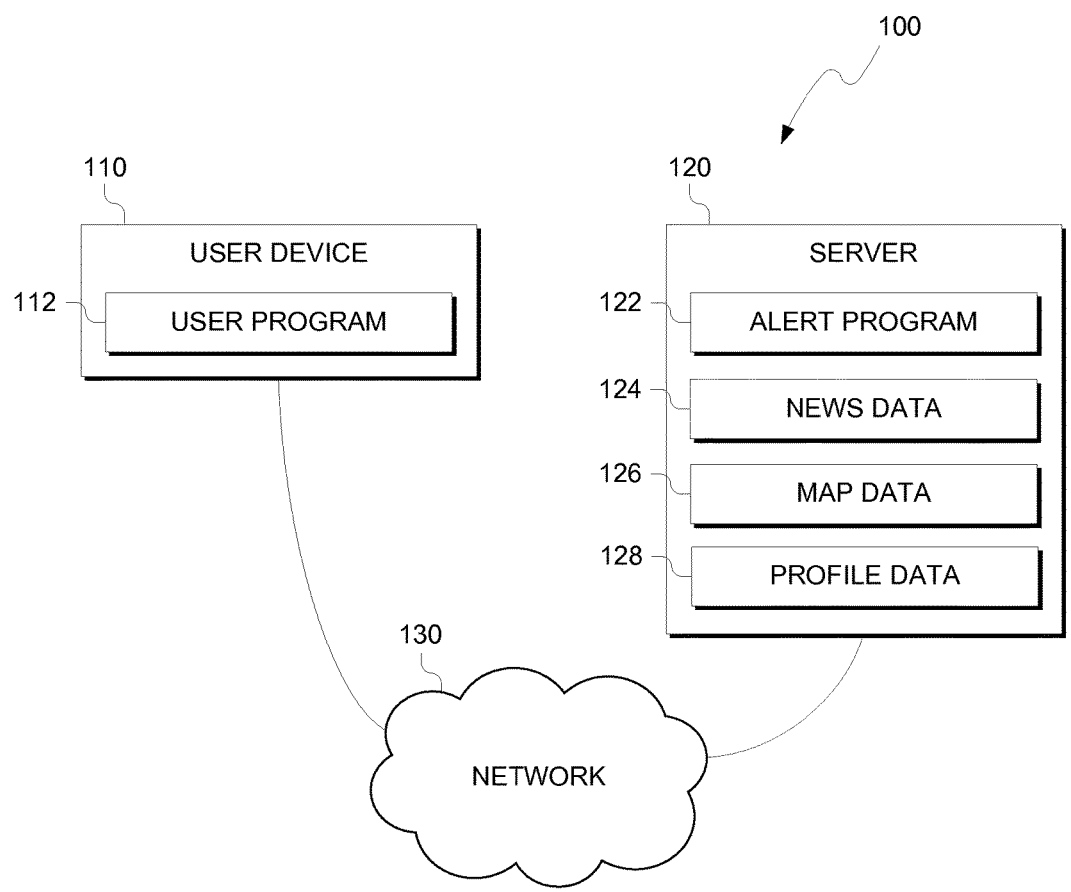
FIG. 1 is a functional block diagram illustrating a networked environment, in accordance with an embodiment of the present invention.

While solutions to geo-fencing are known, they typically are static in the regards to the real-world are covered by the geo-fence. For areas and events that do not change or move, prior solutions provided some usefulness. However for some events, such as developing emergencies and other new events, the area impacted changes over time. Embodiments of the present invention recognize that by retrieving and analyzing available news information, an area of impact for an event can be tracked as news develops. As the area changes size or moves based on new developments, a corresponding geo-fence is created. Users entering or who are currently present in the current geo-fenced area of impact are alerted of the news. In some embodiments, based on available information such as social network messages posted by a user, travel plans or future locations of a user can be identified and, for users associated with but not currently located in the area of impact, alerts can be provided. In a scenario where a user's current location is outside an area of impact but the user is associated with a location inside the area of impact (e.g., the user is on vacation and a severe storm located at or near the user's home, or the user indicates they have travel plans to visit an area with an on-going event), one embodiment has the advantage of providing updates and relevant news to a user about the on-goings of events near a location associated with the user while the user is away from the location.

U.S. Patent Application Publication 2011/0148634 A1 (Putz, J., "Predective Geofence Crossing", Jun. 23, 2011), incorporated herein by reference in its entirety, discloses a predictive geofence system predicts a geofence crossing for a distance-horizon and/or a time-horizon. The predictive geofence system includes a predictive geofence platform that predicts future positions of objects, and generates an alert if the predicted future positions of the objects result in a geofence crossing or the predicted future positions cross a geofence in less than a set time.

U.S. Patent Application Publication 2013/0073388 A1 (Heath, S., "System and method for using impressions tracking and analysis, location information, 2d and 3d mapping, mobile mapping, social media, and user behavior and information for generating mobile and internet posted promotions or offers for, and/or sales of, products and/or services", Mar. 21, 2013), incorporated herein by reference in its entirety, discloses a method, apparatus, computer readable medium, computer system, network, or system, provided for using impressions tracking and analysis, location information, 2D and 3D mapping, social media, and user behavior and information for generating mobile and internet posted promotions or offers for, and/or sales of, products and/or services, for example, through an advertising application programming interfaces (APIs) on mobile devices, tablets, or computers, that provides mobile and web based promotions or offers that connect information and user behavior data to a user or related demographic location or user specified or predicted demographic location(s), such as through the use of as social networking, user or demographic profiles, behavior, and/or relationships, for targeted promotions or offers for products and/or services.

U.S. Patent Application Publication 2013/0295970 A1 (Sheshadri, S., et al., "Geofence breach confidence", Nov. 7, 2013), incorporated herein by reference in its entirety, discloses a system and method for a mobile device to efficiently use a geofence capability without draining its battery, and to allow flexibility in specifying various parameters related to geofencing, such as the latency and confidence in determining when or where a geofence breach occurs, and reducing the probability of not detecting a geofence breach.

U.S. Patent Application Publication 2015/0065177 A1 (Phillips, A., et al., "Location-based Services", Mar. 5, 2015), incorporated herein by reference in its entirety, discloses methods and systems relating to location-based services such as providing a geofencing, outputting location-based information on a mobile device, varying transmissions to and from a mobile device, and providing location-based alerts. More specifically, a method can include receiving data defining a geofence, monitoring a current location, comparing the current location with the geofence, determining that the current location is within the geofence, and in response altering the state of an application on the mobile device.

European Patent Application EP-2-744-234 A1 (Li, A., et al., "Geofencing system and method", Jun. 18, 2014), incorporated herein by reference in its entirety, discloses a geofencing system and method wherein the computational complexity is transferred from a mobile device to a server. The server stores a plurality of geofences in a memory along with addresses of third-party servers associated with each of the geofences, receives current location data from the mobile device, compares the current location data with each of the plurality of geofences to determine whether data is to be obtained from one or more of the third-party servers associated with each of the geofences and, if yes, obtaining the data from the one or more servers and transmitting the data to the mobile device.

WIPO Application Publication WO 2014/118534 A1 (Zimmer, T., et al., "Monitoring system for monitoring a plurality of mobile devices"), incorporated herein by reference in its entirety, discloses monitoring system for monitoring a plurality of mobile devices at a server, the system comprising the server and the plurality of mobile devices, the plurality of mobile devices including a first mobile device, the system configured such that: (i) each mobile device acquires location data; (ii) each mobile device sends the acquired location data to the server via a telecommunications network; (iii) the first mobile device is operable to provide a first message to the server which indicates a high alert level from a user of the first mobile device, and (iv) the first mobile device is operable to provide a second message to the server which indicates a lower level of alert from a user of the first mobile device than the high alert level.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention will now be described in detail with reference to the Figures. FIG. 1 is a functional block diagram illustrating networked environment, generally designated 100, in accordance with one embodiment of the present invention. Networked environment 100 includes user device 110 and server 120 connected over network 130. User device 110 includes user program 112. Server 120 includes alert program 122, news data 124, map data 126 and profile data 128.

In various embodiments of the present invention, user device 110 and server 120 are each a computing device that can be a standalone device, a server, a laptop computer, a tablet computer, a netbook computer, a personal computer (PC), or a desktop computer. In another embodiment, user device 110 and server 120 represent a computing system utilizing clustered computers and components to act as a single pool of seamless resources. In general, user device 110, server 120 or any combination thereof can be any computing device or a combination of devices with access to news data 124, map data 126 and profile data 128 and is capable of executing user program 112 and alert program 122. User device 110 and server 120 may each include internal and external hardware components, as depicted and described in further detail with respect to FIG. 3.

In this exemplary embodiment, user program 112 is stored on user device 110. Alert program 122, news data 124, map data 126 and profile data 128 are stored on server 120. However, in other embodiments, user program 112, alert program 122, news data 124, map data 126 and profile data 128 may be stored externally and accessed through a communication network, such as network 130. Network 130 can be, for example, a local area network (LAN), a wide area network (WAN) such as the Internet, or a combination of the two, and may include wired, wireless, fiber optic or any other connection known in the art. In general, network 130 can be any combination of connections and protocols that will support communications between user device 110 and server 120, in accordance with a desired embodiment of the present invention.

In various embodiments, user device 110 includes a location subsystem or device to determine the current location of user device 110. As discussed herein, when a user is in an area of impact of an ongoing event, or is associated with the area of impact, user program 112 displays an alert message to the user indicating the event. Server 120 includes alert program 122. Alert program 122 retrieves news articles and other information from a variety of sources and devices. News articles include, but are not limited to, text, video or audio including information regarding on-going events. Events include, but are not limited to, natural disasters, weather, or any event that may impact users in a given area, such as heavy traffic. Alert program 122 stores retrieved news articles in news data 124. News data 124 includes the text, audio or video retrieved from the news articles and, in some embodiments, metadata regarding the article, such as when the article became available or was posted by a source.

Based on the news articles in news data 124, alert program 122 determines the content for the article. For text articles, alert program 122 performs natural language processing (NLP) to determine the location of the event, areas affected by the event, and timing of the event. For video and audio articles, alert program 122 converts the audio streams to text by using speech recognition. Alert program 122 determines the content of the audio and video articles by performing NLP to the converted text. Based on the location of the event and area covered by the event, alert program 122 determines an area of impact of the event. An area of impact includes a geographical area that will be impacted by an event. For example, a flood warning is received and a list of counties affected by the warning are included in the warning. Alert program 122 determines the area of impact to include the geographical areas covered by the affected counties.

Server 120 includes map data 126. Map data 126 includes a geographical map of various areas alert program 122 provides messages for ongoing events. When alert program 122 identifies an event in a news article, alert program 122 determines an area of impact and stores an indication of the impacted geographical area in map data 126. The impacted area acts as a geo-fence representing the impacted area. Users located in or associated with the impacted area's geo-fence are provided alerts of the event. A user's current location is retrieved from a location device in communication with user device 110. For example, user device 110 includes and GPS sensor. As another example, user device 110 includes a radio or cellular communication device. Based on a signal strength of the received signal from the communication device, user device 110 determines a current location. User program 112 sends the current location of user device 110 to alert program 122. If the current location of user device is within an area of impact for an event, then alert program sends a message for display to the user by user program 112.

In various embodiments, an alert includes a description of the event. For example, the description includes a type of event and the location of the area of impact (e.g., "Heavy rain in the greater metro area"). In some scenarios, the alert includes links to or copies of the news data 124 that alert program 122 based the area of impact on. In other scenarios, the alert includes information regarding plans or organizations that may provide help or assistance during the event (e.g., a shelter's contact information or location, an emergency help line's phone number, a link to a social network profile of an aid organization, or any information to help during the event or put in contact the user with someone or an organization that can provide assistance). Advantageously, in some embodiments, by comparing the location of a user and the location of an event, embodiments of the present invention provide directed alerts to user's impacted by an event. Some embodiments of the present invention may possess this potential advantages and the potential advantage is not necessarily required in all embodiments. Additionally, the alerts provide information regarding assistance such that impacted user's may seek help in the event of an emergency.

In some scenarios, a user may be associated with an area of impact but not currently be located in the area. For example, a user is on vacation and a hurricane warning is in effect for their hometown. In such scenarios, alert program 122 sends a message alerting users associated with an area of effect of the event. Server 120 includes profile data 128 for a variety of users. Profile data 128 includes but is not limited to, information regarding known locations associated with the user (e.g., home addresses or work addresses), locations associated with friends of the user, other locations the user may visit (e.g., travel plans of the user), and the like. In one scenario, alert program 122 retrieves social network messages posted by the user from a social network platform (not shown), storing the retrieved messages in a profile associated with the user of profile data 128. Alert program 122 performs NLP to determine if the messages contain information indicating future locations of the user (e.g., "Starting my trip to Spain"). During the users travel to Spain, a heavy storm hits the area. Alert program 122 sends a message to user program 112 of the traveling user, alerting them of the storm before they arrive. Advantageously, in some embodiments, by determining the future travel plans or future locations of a user, alerts can be provided to users prior to their arrival to an impacted area. As such, the alert provides the user with information regarding the event and the user may change their travel plans or prepare accordingly. Some embodiments of the present invention may possess this potential advantages and the potential advantage is not necessarily required in all embodiments.

In other scenarios, the area of impact for an event may change over time. A storm may become stronger, weaken, or move. Alert program 122 continues to retrieve news articles. If a newly posted article indicates a change in the event, then alert program 122 updates map data to reflect the change in the area of impact resulting from the updated information. For example, a weather warning for a named hurricane first lists counties on the coast of Florida. Alert program 122 retrieves the warning from a source and determines the content of the event (e.g., hurricane) and the area of effect (the counties in Florida listed in the warning). Alert program 122 creates an area of effect in map data 126 corresponding to the counties listed in the warning. Later alert program 122 retrieves a new weather warning for the same named hurricane, but now the warning indicates coastal counties in South Carolina. Alert program 122 updates the area of effect stored in map data 126 associated with the event (e.g., the named hurricane) to now cover the counties in South Carolina listed in the new weather warning. Advantageously, in some embodiments, by continually monitoring news articles, embodiments of the present invention provide update-to-date information regarding an event. Furthermore, in some embodiments, when a current or future location of a user is within or predicted to be within an area of impact, embodiments of the present invention advantageously provides updated alerts, thereby providing a user with relevant information as events develop. Some embodiments of the present invention may possess this potential advantages and the potential advantage is not necessarily required in all embodiments.

In various embodiments, alert program 122 continues to retrieve news articles regarding events. In some scenarios, alert program 122 determines an event has ended and removes the area of impact from map data 124 associated with the event. For example, a weather warning may have a time indicating the ending of the warning. As another example, alert program 122 retrieves a news article indicating the end of the event. In one scenario, alert program 122 includes a list of average times for event to last. After retrieving a news article indicating an event has begun, alert program 122 will create an area of effect for the event based on the average time associated with the event or similar types of events.

Figure 2:
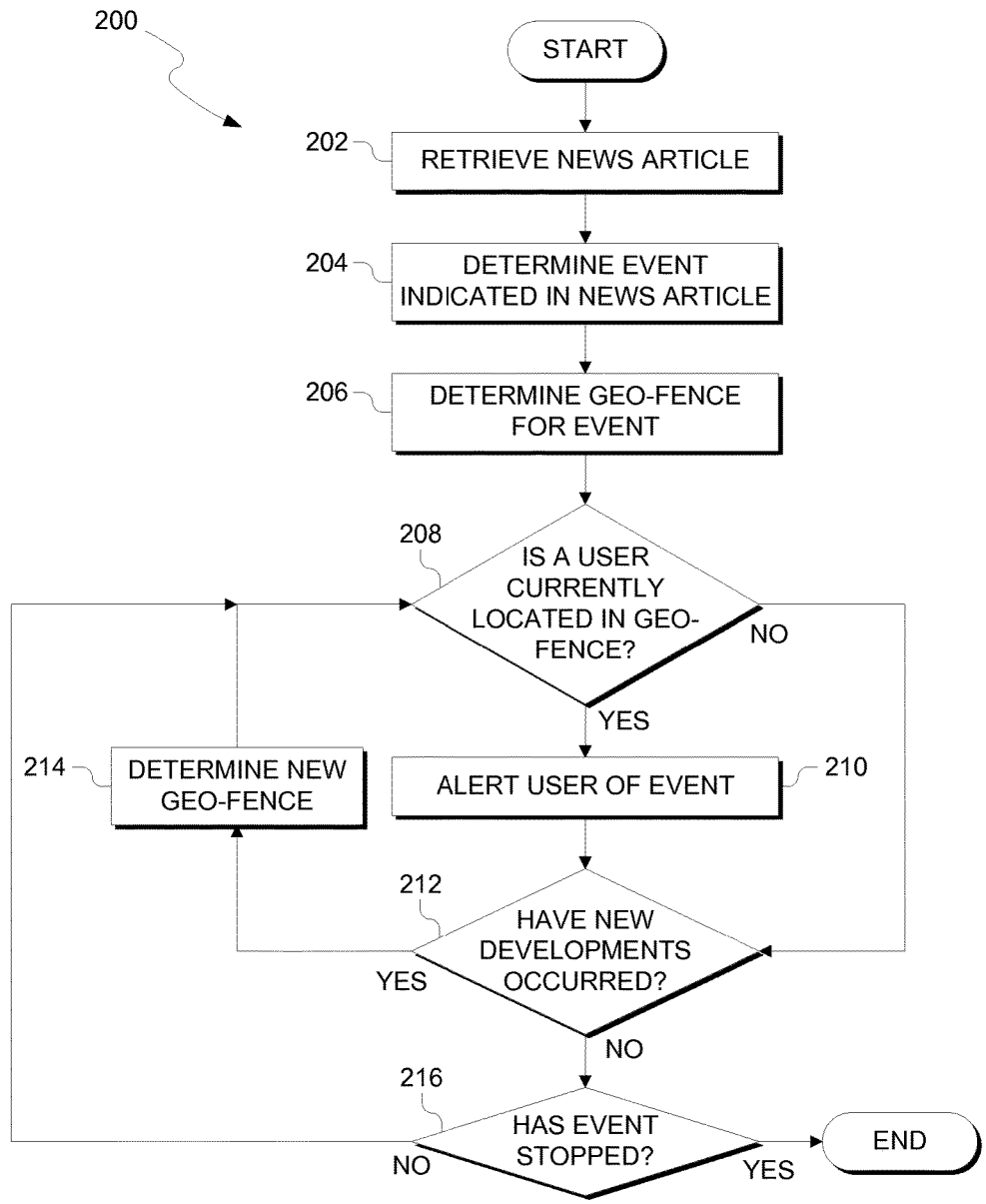
FIG. 2 illustrates operational processes of an alert program, on a computing device within the environment of FIG. 1, in accordance with an embodiment of the present invention.

FIG. 2 illustrates operational processes of alert program 122. In process 202, alert program 122 retrieves a news article from a news source. For example, a news organization provides a Rich Site Summary (RSS) feed with news articles or summaries. Alert program 122 receives news articles via the RSS feeds. Similarly, a news organization posts articles on a website. Alert program 122 includes a web crawler to retrieve and store articles as they are posted to the website. In some scenarios, alert program 122 retrieves messages made by users of a social network. Posts and messages made by users of a social network may have more up-to-date information than a typical news organization.

In various embodiments, alert program 122 determines the content of the news article. Alert program 122 performs NLP to determine the content of the news article. In process 204 alert program 122 determines the event indicated in the news article. In some scenarios, the event may be a specific named event. For example, a news article includes the name of a tropical storm. In other scenarios, the news article includes a type of event. In such a scenario, alert program 122 assigns identifier for the event to track the event. For example, a flood warning is issued for an area. Alert program 122 assigns the event to a flood category and assigns a unique identifier to track the flood (e.g., a general location of the event, such as "eastern panhandle flood").

In process 206, alert program 122 determines the area of impact for the event. In some scenarios, the area may be explicitly listed (e.g., a city's name). In other scenarios, the location may be implied (e.g., a user posts a message on a social network saying "The is a wildfire outside my house", where the implicit area is the home address of the user posing the message). In another scenario, the size of the area of impact for an event may be determined based on the severity of the event. For example, "heavy rains" may have a smaller area compared to a "torrential rain" event.

In decision process 208, alert program 122 determines if a user if within the area of effect for an event. If so (YES branch of decision process 208), then alert program 122 sends an alert message to user program 112 for display to the user (process 210). The message includes a description of the event. In some scenarios, the message includes information regarding help associated with the event, (e.g., the location of the nearest flood shelter). If the user is not currently located in an area of effect (NO branch of decision process 208), then alert program 122 continues to monitor the event and news articles about the event (decision process 212). If new developments have occurred for the event (YES branch of decision process 212), then alert program 122 determines a new area of impact for the event (process 214). For example, a wildfire may have spread to new areas. As such, alert program 122 updates the area of effect for the wildfire event to cover the newly impacted areas. If no new developments have occurred (NO branch of decision process 212), then alert program 122 determines if the event has stopped (decision process 216). In some scenarios, alert program 122 retrieves a news article indicating the event has stopped (e.g., "Fire extinguished"). In other scenarios, alert program 122 includes expected ending times for an event. When the expected ending time has been reached, the alert program removes the event from map data 126. If the event has stopped (YES branch of decision process 216), then alert program 122 removes the event from map data 126. If the event is ongoing (NO branch of process 216), then alert program 122 continues to monitor the user's location, alerting them if they enter, or in some embodiments plan to enter as discussed herein, the area of effect. Furthermore, alert program 122 continues to monitor ongoing developments for the event for various sources to determine and changes in the area of effect of if the event has stopped.

Figure 3:
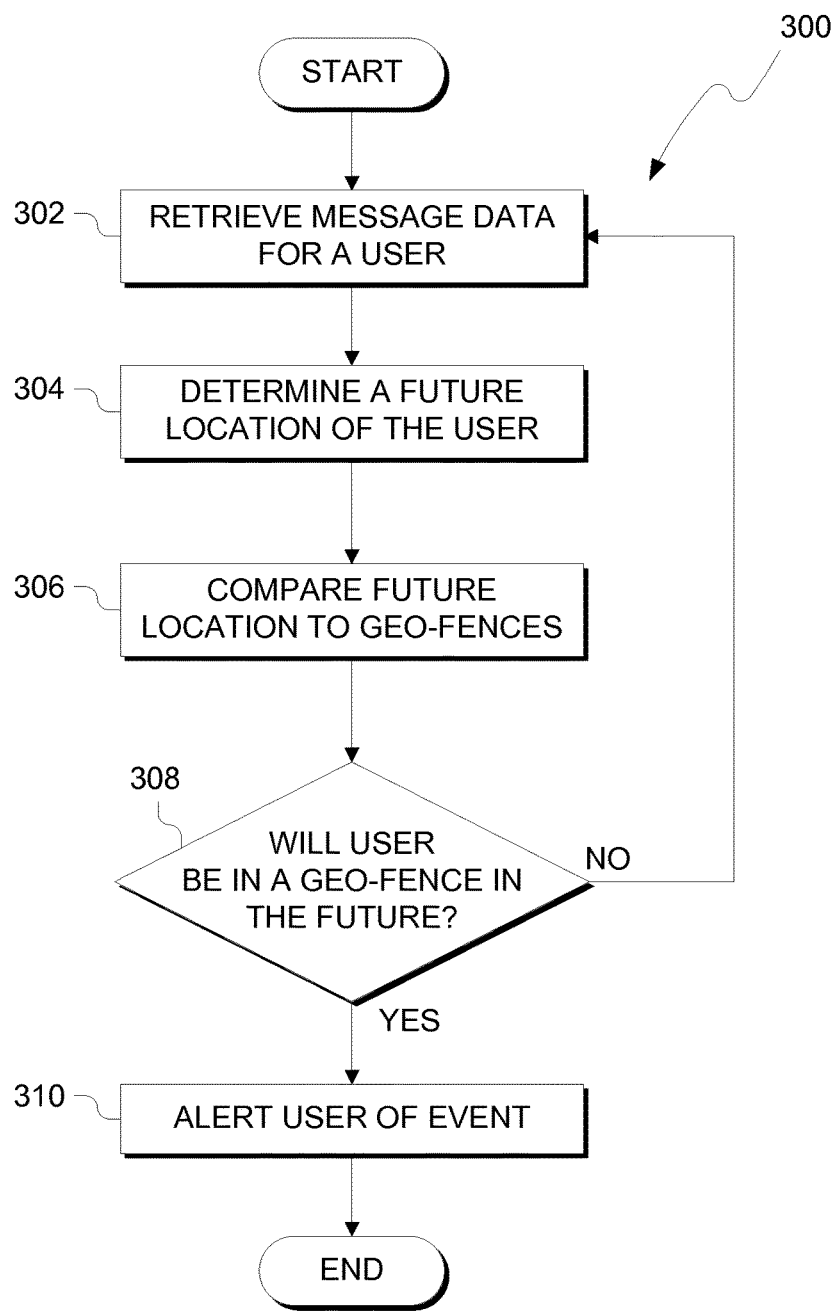
FIG. 3 illustrates operational processes of an alert program including the future location of a user, on a computing device within the environment of FIG. 1, in accordance with an embodiment of the present invention.

FIG. 3 illustrates operational processes of alert program 122 including the future location of a user. In process 302, alert program 122 retrieves message data for a user. Message data includes a variety of messages and post the user has made on one or more social networks. In some scenarios, alert program 122 retrieves message data periodically from a social network, storing the retrieved message data in a profile of profile data 128 associated with the user.

In process 304, alert program 122 determines a future location of the user based on the message data. Alert program 122 determines the content of a message by using Natural Language Processing (NLP). Alert program 122 determines if a location is present in the message data by comparing the text of the message to a dictionary of known locations. For messages containing an explicit location (e.g., "Going to Hong Kong on a business trip"), then alert program 122 determines the explicit location to be a future location of the user. In some scenarios, a message contains an implicit location (e.g., "Going back home to visit mom"). For messages containing implicit locations, alert program 122 retrieves various types of information to determine the implicit location. For example, if a friend or family member is mentioned in a message, alert program 122 retrieves a known location corresponding to the friend or family member. In some scenarios, profile data 128 is present for the friend or family member. As such, alert program 122 receives a location associated with the friend or family member, using the location as the future location of the user. In some embodiments, alert program 122 determines a time frame for the user being at a future location. For example, if a message includes information indicating a time frame (e.g., "Will be at Vegas this weekend."), then alert program 122 assigns a time-frame the user will be at the future location.

In process 306, alert program 122 compares the future location of the user to one or more determined areas of impact in map data 126. As discussed herein, alert program 122 determines areas of impact for events that are currently occurring or predicted to occur. If the user will be in an area of impact associated with an event (YES branch of decision process 308), then alert program 122 sends an alert to the user. The alert includes a description of the event. The alert may also includes news data 124 regarding the event or information regarding assistance pertaining to the event. If the user does not have any message indicating a future location or the future location of the user does not intersect with an area of impact (NO branch of decision process 308), then alert program continues the retrieve messages from various social networks (process 302). Alert program 122 determines if any areas of impact, either new or developing, correspond to a future location of the user, alerting the user as discussed herein.

Figure 4:
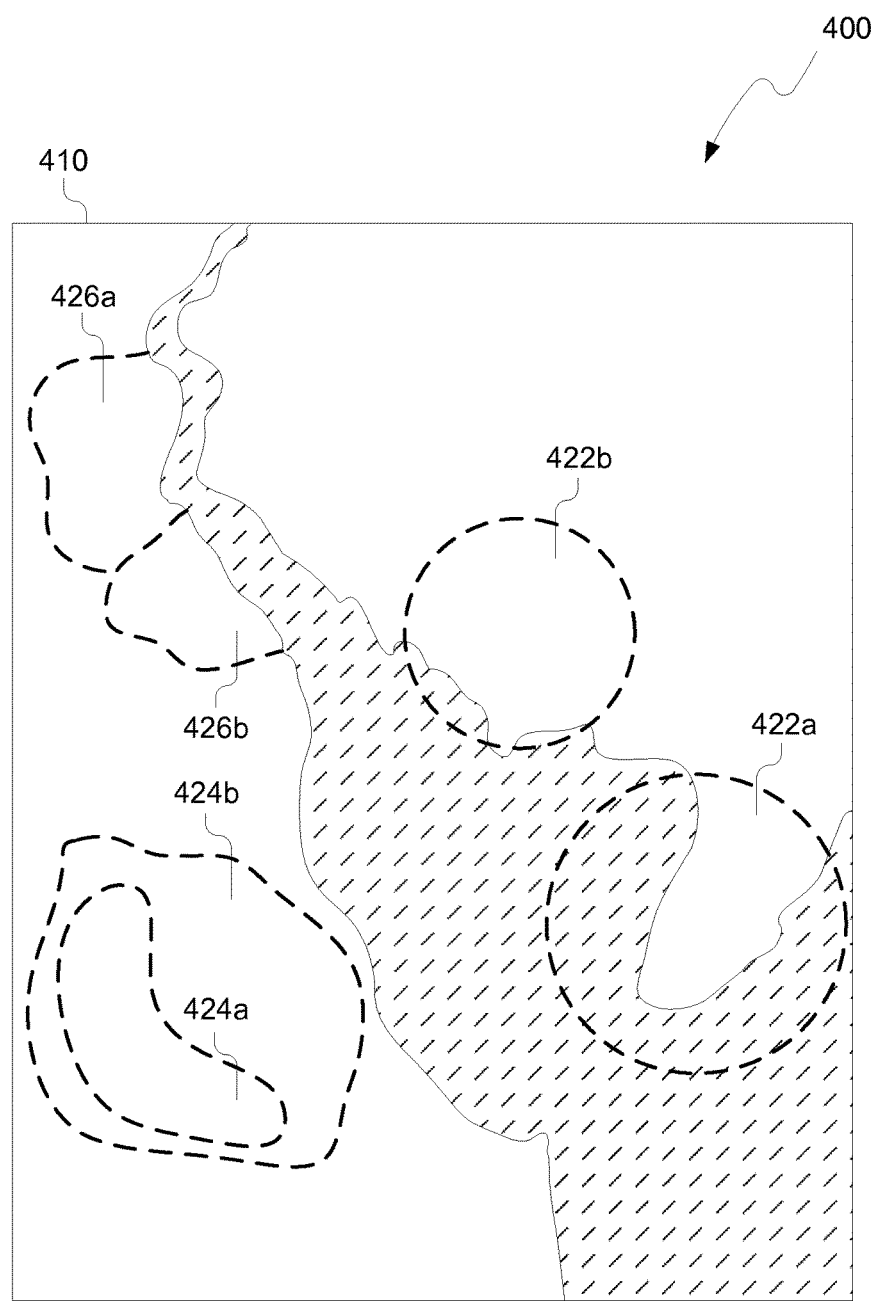
FIG. 4 depicts an illustrative visualization of various areas of impact and locations of various users, in accordance with an embodiment of the present invention.

FIG. 4 depicts an illustrative visualization, 400, includes map 410, areas of impact 422a-b, 424a-b, and 426a-b and locations 432, 434 and 436 of various users. Each pairing 422a-b, 424a-b, and 426a-b indicate an separate initial event areas of impact, 422a, 424a and 426a, and corresponding updated event areas of impact 422b, 424b, and 426b. For example, initial event area of impact 422a may indicate an initial area of impact of a tropical storm or hurricane. A weather report is published on a weather website indicating a hurricane for the area. Alert program 122 creates an area of impact (i.e., initial event area of impact 422a) corresponding to the event. At a later time, an update to the event is received, indicating the hurricane has moved inland and decreased in size. Alert program 122 updates the area of impact corresponding to the event (i.e., updated event area of impact 422b) by moving the area of impact to the new location and lessening the area covered.

As another example, initial event area of impact 424a may indicate an initial area of impact of a wildfire. Alert program 122 creates initial event area of impact 424a based on a report from a forestry organization. When an updated report indicates the wildfire has spread, alert program 122 expands the area of impact to the updated event area of impact 424b. As another example, initial event area of impact 426a may indicate an initial area of impact of a severe weather pattern. Alert program 122 creates initial are of impact 426a based on a weather warning that includes the names of a county affected (e.g., the county outlined by initial area of impact 426a). At a later time, a new weather warning is issued for the same severe weather pattern, however the county list in the initial warning is no longer included in the new warning. Instead, a new county is listed in the warning. Alert program 122 updates the area of impact to cover the indicated county (i.e., updated event area of impact 426b), while no longer including the county indicated on the first warning.

In some embodiments, alert program 122 maintains an area of impact even after news data 124 indicates the event has ceased impact on the area (e.g., a weather report now longer indicates the area under a warning). Based on the severity of the event, alert program 122 maintains the area of impact for an event. For example, for a storm the area of impact may have a smaller impact after the event than a hurricane or other severe weather pattern. As such, alert program 122 maintains the area of impact after the event has ceased so that users may still be able to find assistance and retrieve news data 124 associated with the event. In some embodiments, this also provides an advantage to users who have arrived to an area of impact after the event since they will be alerted of the impacted status of the area they have arrived at. Some embodiments of the present invention may possess this potential advantages and the potential advantage is not necessarily required in all embodiments.

Figure 5:
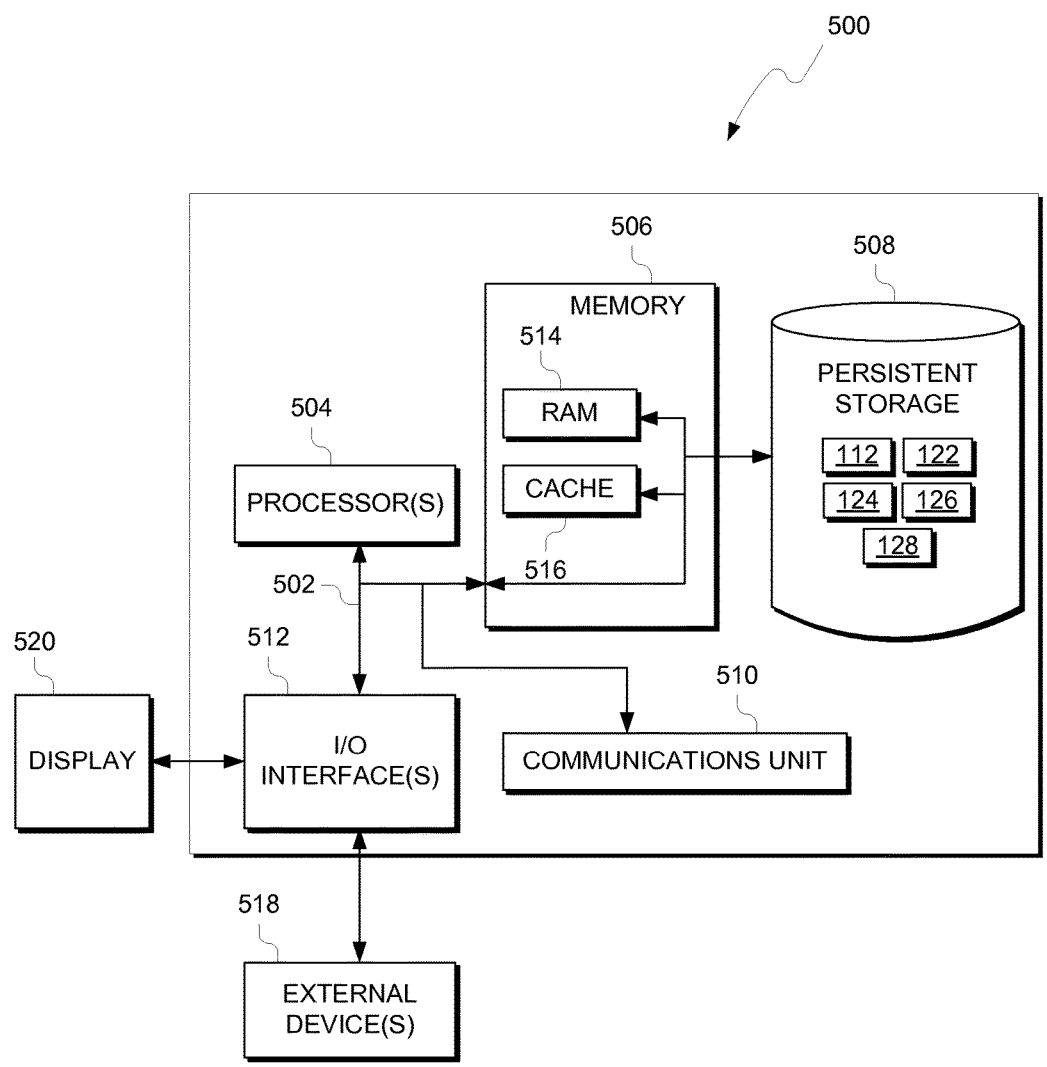
FIG. 5 depicts a block diagram of components of the computing device executing an alert program, in accordance with an embodiment of the present invention.

FIG. 5 depicts a block diagram, 500, of components of user device 110 and server 120, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

User device 110 and server 120 each include communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

User program 112, alert program 122, news data 124, map data 126 and profile data 128 are stored in persistent storage 508 for execution and/or access by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices, including resources of network 130. In these examples, communications unit 510 includes one or more network interface cards. Communications unit 510 may provide communications through the use of either or both physical and wireless communications links. User program 112, alert program 122, news data 124, map data 126 and profile data 128 may be downloaded to persistent storage 508 through communications unit 510.

I/O interface(s) 512 allows for input and output of data with other devices that may be connected to user device 110 and server 120. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g., user program 112, alert program 122, news data 124, map data 126 and profile data 128, can be stored on such portable computer-readable storage media and can be loaded onto persistent storage 508 via I/O interface(s) 512. I/O interface(s) 512 also connect to a display 520.

Display 520 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) "Smalltalk" and the like may be subject to trademark rights in various jurisdictions throughout the world and are used here only in reference to the products or services properly denominated by the marks to the extent that such trademark rights may exist.

What is claimed is:

1. A method comprising:
   identifying, by one or more processors, an event based, at least in part, on a first news article;
   determining, by the one or more processors, a first geo-fence for the event based, at least in part, on the first news article;
   in response to a determination that a current location of a first user is within the first geo-fence, sending, by the one or more processors, a first message to the first user based, at least in part, on the first news article; and
   in response to a determination that a future location of a second user is within the first geo-fence, sending, by the one or more processors, a second message to the second user based, at least in part, on the first news article, wherein the current location of the second user is outside the first geo-fence.

2. The method of claim 1, the method further comprising:
   identifying, by the one or more processors, an update to the event based, at least in part, on a second news article; and
   determining, by the one or more processors, a second geo-fence for the event based, at least in part, on the second news article.

3. The method of claim 2, the method further comprising:
   in response to a determination that a current location of a second user is within the second geo-fence, sending, by the one or more processors, a second message to the second user based, at least in part, on the second news article.

4. The method of claim 3, wherein the current location of the second user is outside the first geo-fence.

5. The method of claim 1, the method further comprising:
   in response to a determination that a home location of a second user is within the first geo-fence, sending, by the one or more processors, a second message to the second user based, at least in part, on the first news article, wherein the current location of the second user is outside the first geo-fence.

6. The method of claim 1, wherein the home location is based, at least in part, on messages posted on a social profile of the second user.

7. A computer program product comprising:
one or more computer-readable storage media and program instructions stored on the one or more computer-readable storage media, the program instructions comprising:
program instructions to identify an event based, at least in part, on a first news article;
program instructions to determine a first geo-fence for the event based, at least in part, on the first news article;
responsive to a determination that a current location of a first user is within the first geo-fence, program instructions to send a first message to the first user based, at least in part, on the first news article; and
in response to a determination that a future location of a second user is within the first geo-fence, program instructions to send a second message to the second user based, at least in part, on the first news article, wherein the current location of the second user is outside the first geo-fence.

8. The computer program product of claim 7, the program instructions further comprising:
program instructions to identify an update to the event based, at least in part, on a second news article; and
program instructions to determine a second geo-fence for the event based, at least in part, on the second news article.

9. The computer program product of claim 8, the program instructions further comprising:
in response to a determination that a current location of a second user is within the second geo-fence, program instructions to send a second message to the second user based, at least in part, on the second news article.

10. The computer program product of claim 9, wherein the current location of the second user is outside the first geo-fence.

11. The computer program product of claim 7, the program instructions further comprising:
in response to a determination that a home location of a second user is within the first geo-fence, program instructions to send a second message to the second user based, at least in part, on the first news article, wherein the current location of the second user is outside the first geo-fence.

12. The computer program product of claim 7, wherein the home location is based, at least in part, on messages posted on a social profile of the second user.

13. A computer system comprising:
one or more computer processors;
one or more computer readable storage media; and
program instructions stored on the computer readable storage media for execution by at least one of the one or more processors, the program instructions comprising:
program instructions to identify an event based, at least in part, on a first news article;
program instructions to determine a first geo-fence for the event based, at least in part, on the first news article;
responsive to a determination that a current location of a first user is within the first geo-fence, program instructions to send a first message to the first user based, at least in part, on the first news article; and
in response to a determination that a future location of a second user is within the first geo-fence, program instructions to send a second message to the second user based, at least in part, on the first news article, wherein the current location of the second user is outside the first geo-fence.

14. The computer program product of claim 13, the program instructions further comprising:
program instructions to identify an update to the event based, at least in part, on a second news article; and
program instructions to determine a second geo-fence for the event based, at least in part, on the second news article.

15. The computer program product of claim 14, the program instructions further comprising:
in response to a determination that a current location of a second user is within the second geo-fence, program instructions to send a second message to the second user based, at least in part, on the second news article.

16. The computer program product of claim 15, wherein the current location of the second user is outside the first geo-fence.

17. The computer program product of claim 13, the program instructions further comprising:
in response to a determination that a home location of a second user is within the first geo-fence, program instructions to send a second message to the second user based, at least in part, on the first news article, wherein the current location of the second user is outside the first geo-fence.

* * * * *